United States Patent
Katumaru et al.

(10) Patent No.: US 7,077,402 B2
(45) Date of Patent: Jul. 18, 2006

(54) COMBINED OIL RING

(75) Inventors: Masakazu Katumaru, Arlington heights, IL (US); Seiji Tamaki, Okaya (JP); Masami Kawasaki, Nisshin (JP)

(73) Assignee: Teikoku Piston Ring Co., Ltd., Tokyo (JP)

( * ) Notice: Subject to any disclaimer, the term of this patent is extended or adjusted under 35 U.S.C. 154(b) by 8 days.

(21) Appl. No.: 10/727,560

(22) Filed: Dec. 5, 2003

(65) Prior Publication Data

US 2004/0119242 A1    Jun. 24, 2004

(30) Foreign Application Priority Data

Dec. 18, 2002    (JP)    ............ 2002-366425

(51) Int. Cl.
*F16J 9/00*    (2006.01)
(52) U.S. Cl. ..................... 277/434; 277/442
(58) Field of Classification Search ............ 277/434, 277/442, 443, 444
See application file for complete search history.

(56) References Cited

U.S. PATENT DOCUMENTS

| | | | |
|---|---|---|---|
| 2,079,977 A * | 5/1937 | Wenzel | 277/453 |
| 2,511,874 A | 6/1950 | Phillips | |
| 2,614,899 A | 10/1952 | Phillips | |
| 2,657,962 A | 11/1953 | Robinson | |
| 2,712,971 A | 7/1955 | Phillips et al. | |
| 2,940,803 A * | 6/1960 | Phillips | 277/444 |
| 3,645,174 A * | 2/1972 | Prasse | 92/193 |
| 3,831,952 A * | 8/1974 | Geffroy | 277/447 |
| 4,045,036 A * | 8/1977 | Shunta | 277/476 |
| 4,331,065 A * | 5/1982 | Fellberg | 92/158 |
| 5,271,315 A * | 12/1993 | Jackson | 277/452 |
| 5,295,696 A | 3/1994 | Harayama et al. | |
| 5,598,763 A * | 2/1997 | Rao et al. | 92/212 |
| 5,779,243 A * | 7/1998 | Hanlon | 277/434 |
| 5,788,246 A * | 8/1998 | Kuribayashi et al. | 277/463 |
| 6,039,321 A | 3/2000 | Jo | |

FOREIGN PATENT DOCUMENTS

| | | | |
|---|---|---|---|
| JP | 59-155552 | * | 9/1984 |
| JP | 4-95169 | | 8/1992 |
| JP | 9-144881 | | 6/1997 |
| JP | 2000-320672 | * | 11/2000 |

\* cited by examiner

*Primary Examiner*—Alison K. Pickard
(74) *Attorney, Agent, or Firm*—Armstrong, Kratz, Quintos, Hanson & Brooks, LLP (57) ABSTRACT

A combined oil ring 4 is comprised of an oil ring 5 having upper and lower rails 7 and 8, and an expander 6 for applying contact pressure radially outwards on the oil ring 5. The outer circumferential surface 11 of the upper rail 7 of the oil ring 5 is comprised of a flat surface 11$a$ with an axial width of 0.05 to 0.3 millimeters, a curved surface 11$b$ joining to the upper end of the flat surface 11$a$ and to the upper surface 12 of the upper rail 7, and a curved surface 11$c$ joining to the lower end of the flat surface 11$a$ and to the lower surface 13 of the upper rail 7. The lower rail 8 is formed in the same way.

4 Claims, 6 Drawing Sheets

COMBINED OIL RING

BACKGROUND OF THE INVENTION

1. Field of the Invention

The present invention relates to a combined oil ring for oil control which is mounted on pistons in reciprocating internal combustion engines and compressors, etc.

2. Description of the Related Art

Two-piece type, steel combined oil rings comprised of an oil ring and an expander are used in internal combustion engines. The combined oil ring is often used in diesel engines. Recently however, because of their excellent durability and low rate of drop in tension due to wear, combined oil rings are also often being used in gasoline engines. The demand in recent years for low fuel consumption has also led to demands for low friction even in oil rings. Measures taken to reduce friction in oil rings include lowering the tension and low-friction surface treating of the outer circumferential surface and upper and lower surfaces.

Figure 6A:
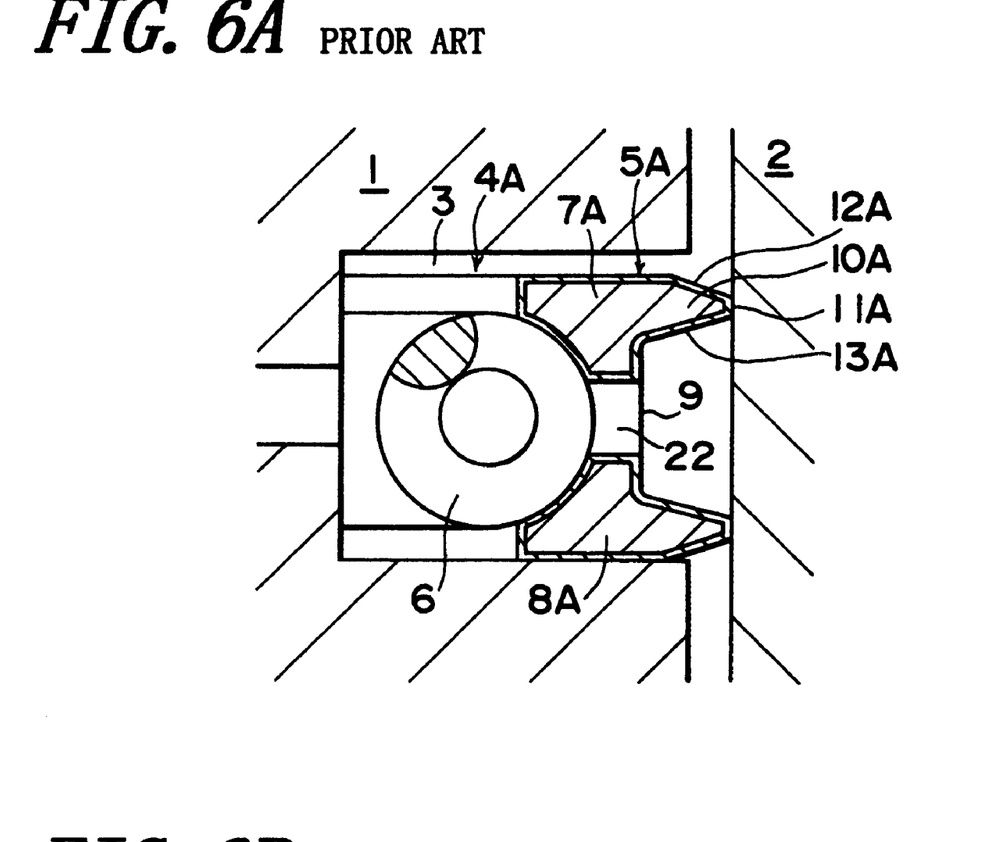
FIG. 6A is a vertical cross sectional view showing the combined oil ring mounted on the piston within the cylinder.
Figure 6B:
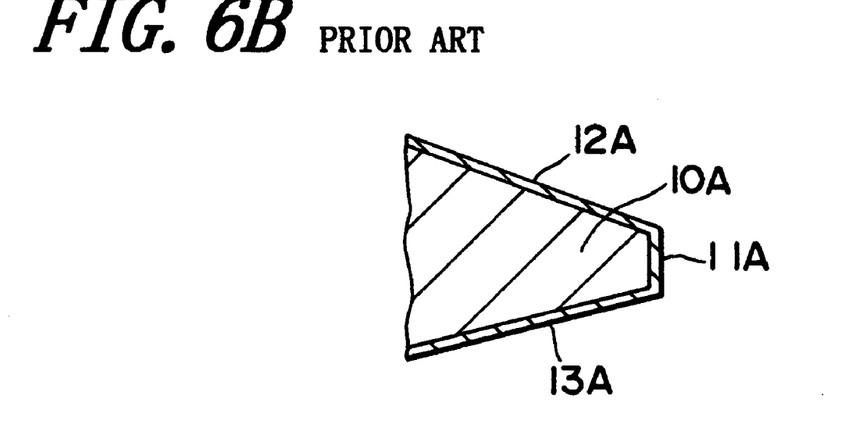
FIG. 6B is an enlarged cross sectional view showing a portion of the upper rail.

The oil ring 5A of the two-piece type combined oil ring 4A, as shown in FIGS. 6A and 6B, has upper and lower rails 7A and 8A linked by a web 9. Numerous oil holes 22 are formed in the web 9 to allow oil scraped up by the rails to pass through. An outer circumferential protrusion 10A of the upper rail 7A is formed in a roughly trapezoidal shaped cross section defined by an outer circumferential surface 11A forming a flat surface and upper and lower surfaces 12A and 13A forming a pair of oblique surfaces joining to the surface 11A. The outer circumferential surface 11A and upper and lower surfaces 12A and 13A form sharp corners. The lower rail 8A is formed identical to the upper rail 7A. The reference numeral 1 denotes a piston, 2 denotes a cylinder, 3 denotes a ring groove and 6 denotes a coil expander.

A combined oil ring was disclosed in the prior art for reducing lubricating oil consumption and improving scuff resistance by forming the rail outer circumferential surface as an arc surface whose highest point is located at the center of the axial rail width (See Japanese Utility Model Laid-Open No.4-95169).

A combined oil ring was disclosed in the prior art for limiting the oil scraping effect when the piston slide upwards, by forming the rail outer circumferential surface as a flat surface and a tapered surface (See Japanese Patent Laid-Open No. 9-144881).

The above described combined oil rings of the prior art had the following problems during sliding axial movement in the cylinder while mounted in the ring groove of a piston. The combined oil ring of the prior art formed with only a flat surface as the rail outer circumferential surface had the problem that friction sometimes increased because the sharp corners on the rail outer circumference contacted the inner circumferential surface of the cylinder at localized portions due to piston secondary motion. The combined oil ring of the prior art formed with an arc surface as the rail outer circumferential surface had the problem that contact pressure was too high due to line contact peripherally with the inner circumferential surface of the cylinder and friction sometimes increased. The combined oil ring of the prior art formed with a flat surface and a tapered surface as the rail outer circumferential surface had the problem that the friction sometimes increased due to the lower corner on the lower rail outer circumference during the piston downward stroke. Moreover, when the piston was inclined or rising, the sharp upper corner on the upper rail outer circumference contacted the inner circumferential surface of the cylinder at localized portions and the friction sometimes increased.

SUMMARY OF THE INVENTION

In view of the above problems with the related art, the present invention has the object of providing a combined oil ring for reducing friction and also having good oil scraping performance.

To accomplish the above objects, the present invention employs the following means. Namely, the combined oil ring is comprised of an oil ring having upper and lower rails, and an expander for applying contact pressure radially outwards on the oil ring wherein;

the outer circumferential surface of the upper rail of the oil ring is comprised of a flat surface with an axial width of 0.05 to 0.3 millimeters, a curved surface joining to the upper end of the flat surface and to the upper surface of the upper rail, and a curved surface joining to the lower end of the flat surface and to the lower surface of the upper rail, and the outer circumferential surface of the lower rail is comprised of a flat surface with an axial width of 0.05 to 0.3 millimeters, a curved surface joining to the upper end of the flat surface and to the upper surface of the lower rail, and a curved surface joining to the lower end of the flat surface and to the lower surface of the lower rail.

The above structure acts to suppress an increase in friction during sliding movement within the cylinder bore occurring at localized portions due to the rail outer circumferential corner and lowers the friction. Making the axial width of the outer circumferential flat surface which contacts the inner circumferential surface of the cylinder to 0.05 to 0.3 millimeters serves to reduce initial wear on the outer circumferential sliding surfaces and stabilize the oil consumption. The initial wear increases when the axial width is below 0.05 millimeters and the oil scraping performance is poor when the axial width exceeds 0.3 millimeters.

The radial width of the curved surface is preferably within 25 to 75 micrometers. The friction increases when the radial width is below 25 micrometers and the oil consumption increases when in excess of 75 micrometers.

The present invention can also be comprised as described next. In other words, the combined oil ring is comprised of an oil ring having upper and lower rails, and an expander for applying contact pressure radially outwards on the oil ring wherein;

the outer circumferential surface of the upper rail of the oil ring is comprised of a flat surface with an axial width of 0.05 to 0.3 millimeters, and a curved surface joining to the upper end of the flat surface and to the upper surface of the upper rail, and the outer circumferential surface of the lower rail is comprised of a flat surface with an axial width of 0.05 to 0.3 millimeters, and a curved surface joining to the lower end of the flat surface and to the lower surface of the lower rail.

This structure acts to suppress an increase in friction during sliding movement within the cylinder bore occurring at localized portions due to the rail outer circumferential corner and lowers the friction. Making the axial width of the outer circumferential flat surface which contacts the inner circumferential surface of the cylinder to 0.05 to 0.3 millimeters serves to reduce initial wear on the outer circumferential sliding surfaces and stabilize the oil consumption. The initial wear increases when the axial width is below 0.05 millimeters. The oil scraping performance becomes poor when the axial width exceeds 0.3 millimeters. The corner on the lower end of the upper rail contributes to oil scraping.

The radial width of the curved surface is preferably within 25 to 75 micrometers. The friction increases when the radial width is below 25 micrometers and the oil consumption increases when in excess of 75 micrometers.

The present invention can also be configured as follows. Namely, the combined oil ring is comprised of an oil ring having upper and lower rails, and an expander for applying contact pressure radially outwards on the oil ring wherein;

the outer circumferential surface of the upper rail of the oil ring is comprised of a curved surface joining to the upper surface of the upper rail with the radial rail width decreasing from the lower end of the upper rail, and the outer circumferential surface of the lower rail is comprised of a curved surface joining to the lower surface of the lower rail with the radial rail width decreasing from the upper end of the lower rail.

This structure acts to suppress an increase in friction during sliding movement within the cylinder bore occurring at localized portions due to the rail outer circumferential corner and lowers friction. The corner on the lower end of the upper rail contributes to oil scraping performance. The oil ring makes line contact peripherally with the inner circumferential surface of the cylinder, however, an increase in friction is prevented because an oil film tends to be formed during the piston upward stroke.

The radial width of the curved surface is preferably within 25 to 75 micrometers. The friction increases when the radial width is below 25 micrometers, and the oil consumption increases when in excess of 75 micrometers.

The present invention may have the following structure. In other words, the combined oil ring is comprised of an oil ring having upper and lower rails, and an expander for applying contact pressure radially outwards on the oil ring wherein;

the outer circumferential surfaces of the upper and lower rails of the oil ring are comprised of an asymmetrical barrel curved surface whose highest point is located at the lower side axially from the center of the axial rail width.

This structure acts to suppress an increase in friction during sliding movement within the cylinder bore occurring at localized portions due to the rail outer circumferential corner and lowers the friction. Moreover, oil scraping performance is improved and the scuff resistance is improved. The oil ring makes line contact peripherally with the inner circumferential surface of the cylinder, however, an increase in friction is prevented because an oil film tends to be formed during the piston upward stroke.

The radial width on the upper side of the asymmetrical barrel curved surface is preferably 25 to 75 micrometers and the radial width on the lower side is preferably 1 to 20 micrometers. When the upper side radial width is below 25 micrometers, the friction increases and oil consumption increases due to oil scraping. When the radial width is in excess of 75 micrometers, the oil consumption increases. When the lower side radial width is below 1 micrometer, the friction increases and scuffing is easily prone to occur. When the radial width exceeds 20 micrometers, the oil consumption increases.

Low-friction surface treatment is preferably applied to the outer circumferential surface of the upper and lower rails which slide on the cylinder. The low-friction surface treatment includes forming a nitrided layer, a physical vapor deposition film comprised of CrN or $Cr_2N$, or a diamond-like carbon film. This surface treatment processing improves the wear resistance characteristics and lowers the friction. In the case of a physical vapor deposition film or diamond-like carbon film, the inner side of the film is preferably formed with a nitrided layer.

BRIEF DESCRIPTION OF THE DRAWINGS

FIGS. 1A through 1C are showing the first embodiment of the present invention;

FIGS. 2A through 2C are showing another embodiment of the present invention;

FIGS. 3A through 3C are showing another embodiment of the present invention;

FIGS. 4A through 4C are showing another embodiment of the present invention;

FIGS. 6A and 6B are showing the combined oil ring of the prior art;

DESCRIPTION OF THE PREFERRED EMBODIMENTS

The preferred first embodiment of the present invention is described next while referring to the accompanying drawings.

Figure 1A:
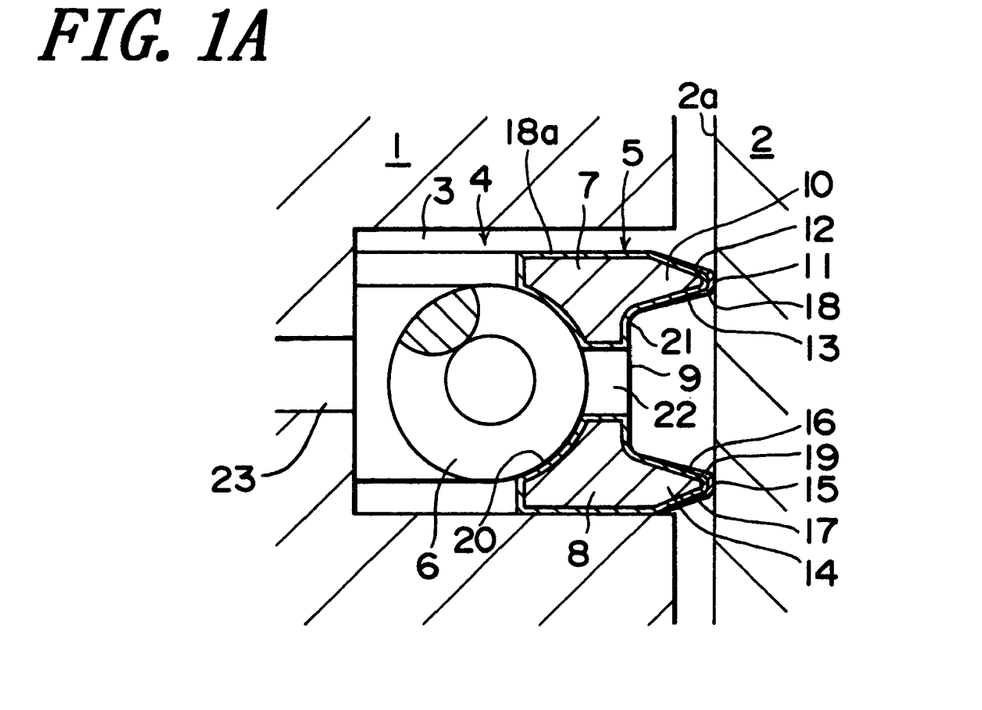
FIG. 1A is a vertical cross sectional view showing the combined oil ring mounted on the piston within the cylinder.

In FIG. 1, the reference numeral 1 denotes a piston, and the reference numeral 2 denotes a cylinder. A combined oil ring 4 is installed in a ring groove 3 formed on the outer circumference of the piston 1. The combined oil ring 4 is a two-piece type combined oil ring made of steel. The combined oil ring 4 is comprised of an oil ring 5 and a coil expander 6.

The oil ring 5 is a steel ring with a generally I-shaped cross section and has a gap. The oil ring 5 is comprised of a pair of upper and lower rails 7 and 8 extending to the periphery and a straight web 9 extending to the periphery and connecting the upper and lower rails 7 and 8.

Figure 1B:
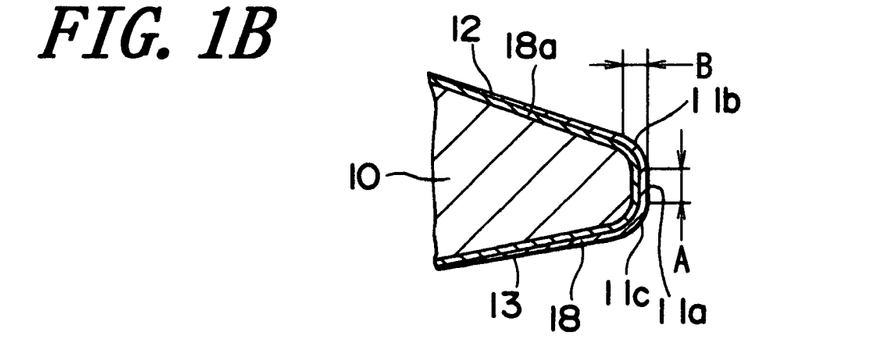
FIG. 1B is an enlarged cross sectional view showing a portion of the upper rail.

A protrusion 10 on the outer circumferential side of the upper rail 7 is formed in a cross section with a roughly trapezoidal shape defined by an outer circumferential surface 11 and a pair of oblique upper and lower surfaces 12 and 13 joining to the outer circumferential surface 11. The width of the protrusion 10 becomes narrower toward the outer circumferential surface. The outer circumferential surface 11 is comprised of a flat surface 11a for sliding on an inner circumferential surface 2a of the cylinder 2; and an arc-shaped curved surface 11b smoothly joining to the upper end of the flat surface 11a and to the upper surface 12 of the upper rail 7; and an arc-shaped curved surface 11c smoothly joining to the lower end of the flat surface 11a and to the lower surface 13 of the upper rail 7. The axial width A of the flat surface 11a is from 0.05 to 0.3 millimeters. The radial width B of the arc-shaped curved surfaces 11b and 11c is from 25 to 75 micrometers.

Figure 1C:
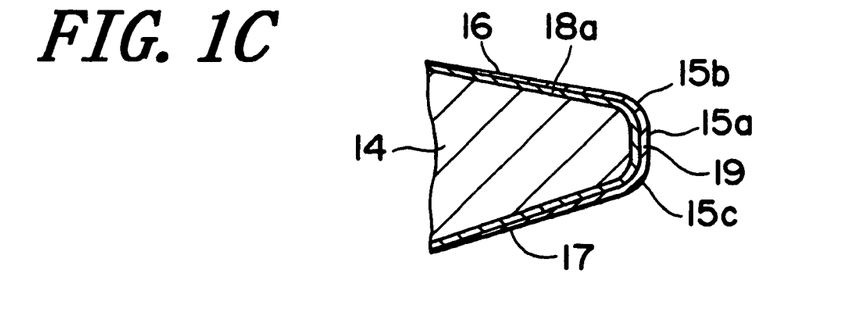
FIG. 1C is an enlarged cross sectional view showing a portion of the lower rail.

The lower rail 8 is formed the same as the upper rail 7. On the upper rail 8, the reference numeral 14 is a protrusion on the outer circumference, the reference numeral 15 is an outer circumferential surface, and the reference numerals 16 and 17 are a pair of oblique upper and lower surfaces joining to the outer circumferential surface 15. The outer circumferential surface 15 is comprised of a flat surface 15a, and a pair of upper and lower arc-shaped curved surfaces 15b and 15c.

Low-friction surface treatment is applied to the outer circumferential surfaces 11 and 15 of the upper and lower rails 7 and 8 of the oil ring 5, or in other words, the flat surfaces 11a and 15a and the upper and lower pair of arc-shaped curved surfaces 11b, 11c, 15b and 15c. In the present embodiment, these outer circumferential surfaces are covered by a physical vapor deposition film comprised of CrN or $Cr_2N$, or a diamond-like carbon film 18 and 19, and a nitrided layer 18a is formed on the inner side. This nitrided layer 18a covers the entire surface of the oil ring 5.

A coil expander 6 is mounted in an inner circumferential groove 20 formed on the inner circumferential side of the oil ring 5. The coil expander 6 exerts contact pressure radially outwards on the oil ring 5 and presses the oil ring 5 on the cylinder inner circumferential surface 2a.

The oil ring 5 pressed towards the cylinder inner circumferential surface 2a by the coil expander 6 slides along the cylinder inner circumferential surface 2a. The oil scraped off the cylinder inner circumferential surface 2a flows along an the outer circumferential groove 21 between the protrusions 10 and 14 on the outer circumferential side of the upper and lower rails 7 and 8, and passes through multiple oil holes 22 formed at intervals along the circumference of the web 9, moving to the inner circumferential side of the oil ring 5, and returns to an oil pan by way of an oil return hole 23 formed in the piston 1.

Even if a tilt in the piston 1 occurs at this time, an increase in localized friction due to the rail outer circumferential corner is suppressed and low friction is achieved. Further, initial wear on the outer circumferential sliding surface is reduced and oil consumption is stabilized by the outer circumferential flat surfaces 11a and 15a of the specified axial width.

Figure 2A:
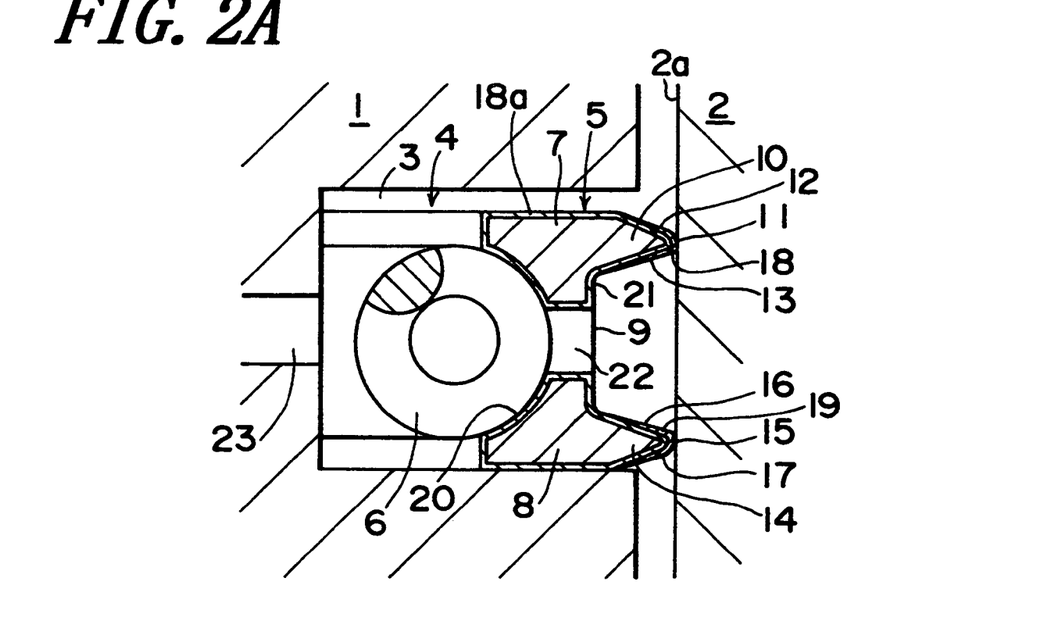
FIG. 2A is a vertical cross sectional view showing the combined oil ring mounted on the piston within the cylinder.
Figure 2B:
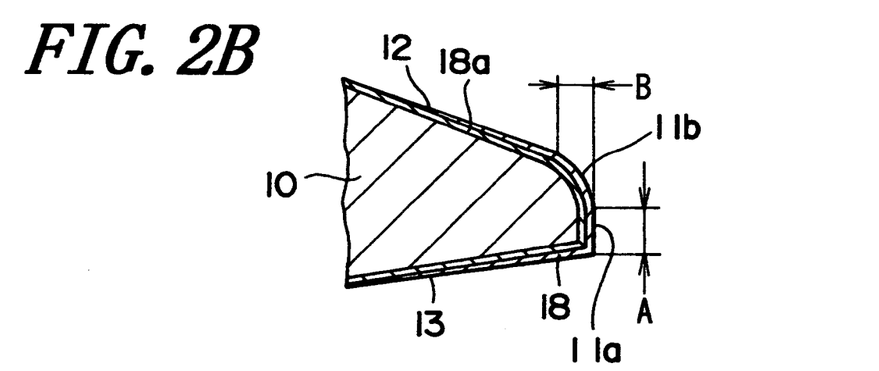
FIG. 2B is an enlarged cross sectional view showing a portion of the upper rail.
Figure 2C:
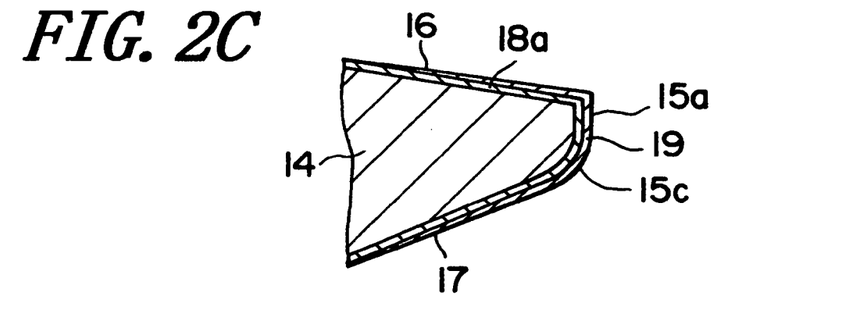
FIG. 2C is an enlarged cross sectional view showing a portion of the lower rail.

FIG. 2 shows a second embodiment as another preferred embodiment of the present invention. This second embodiment differs from the first embodiment only in that the outer circumferential shape of the oil ring is different. In all other respects, the structure is the same as the first embodiment.

In the second embodiment, the outer circumferential surface 11 of the upper rail 7 of the oil ring 5 is comprised of a flat surface 11a for sliding on the cylinder inner circumferential surface 2a, and an arc-shaped curved surface 11b smoothly joining to the upper end of the flat surface 11a and to the upper surface 12 of the upper rail 7. The axial width A of the flat surface 11a is from 0.05 to 0.3 millimeters. The radial width B of the arc-shaped curved surface 11b is from 25 to 75 micrometers.

The outer circumferential surface 15 of the lower rail 8 is comprised of a flat surface 15a for sliding on the cylinder inner circumferential surface 2a, and an arc-shaped curved surface 15c smoothly joining to the lower end of the flat surface 15a and to the lower surface 17 of the lower rail 8. The axial width of the flat surface 15a is from 0.05 to 0.3 millimeters. The radial width of the arc-shaped curved surface 15c is from 25 to 75 micrometers.

In the case of the second embodiment also, even if a tilt in the piston 1 occurs, an increase in localized friction due to the rail outer circumferential corner is suppressed and low friction is achieved. Initial wear on the outer circumferential sliding surface is reduced and oil consumption is stabilized by the outer circumferential flat surfaces 11a and 15a of the specified axial width. The sharp corner on the lower end of the upper rail 7 contributes to improving the oil scraping performance.

Figure 3A:
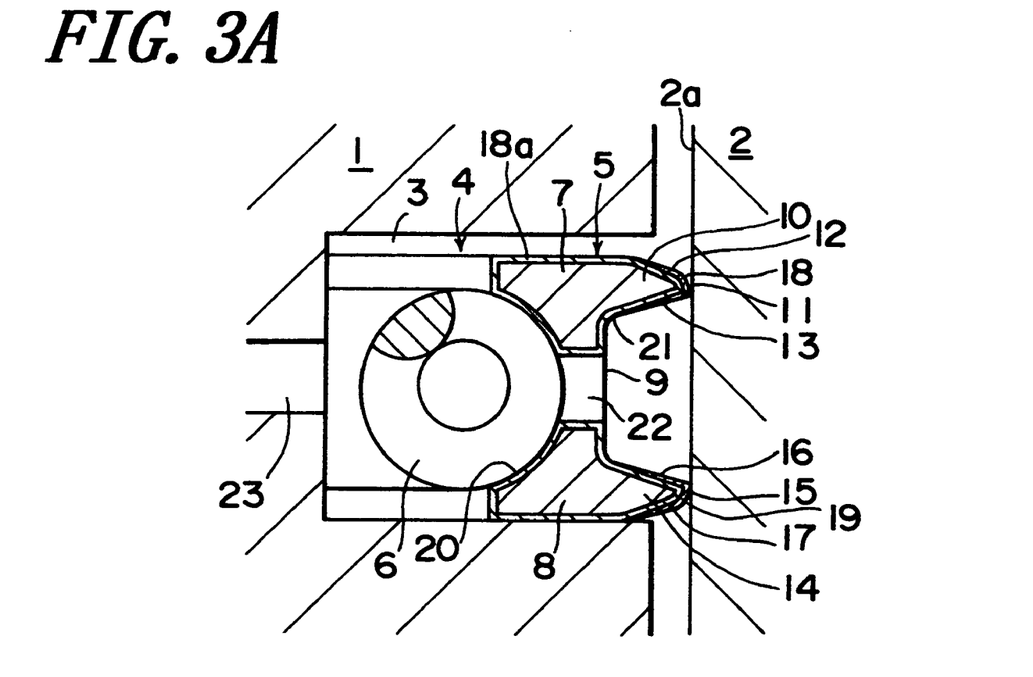
FIG. 3A is a vertical cross sectional view showing the combined oil ring mounted on the piston within the cylinder.
Figure 3B:
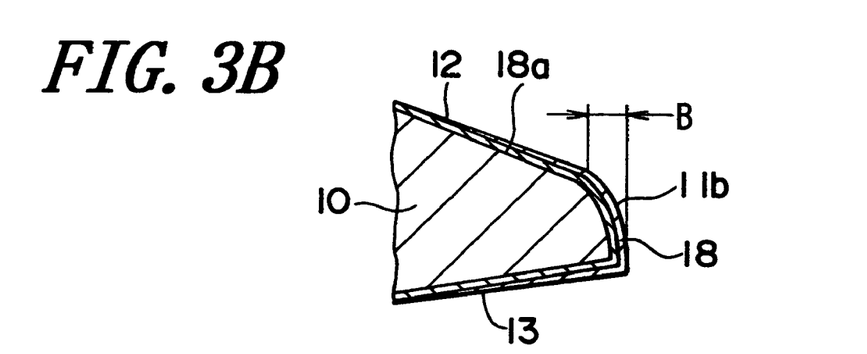
FIG. 3B is an enlarged cross sectional view showing a portion of the upper rail.
Figure 3C:
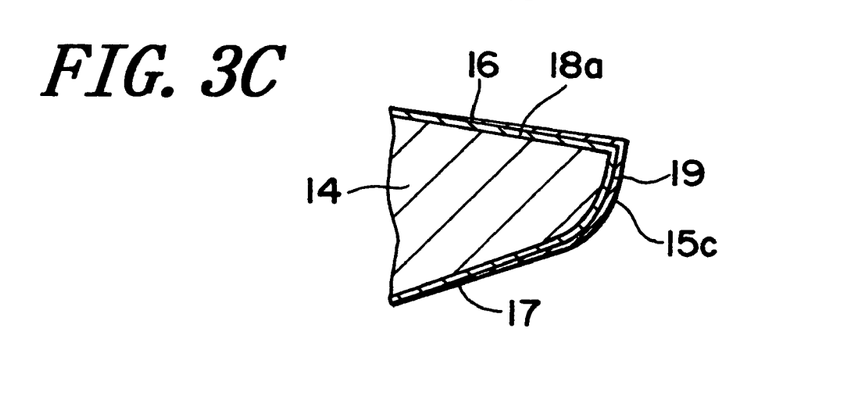
FIG. 3C is an enlarged cross sectional view showing a portion of the lower rail.

FIG. 3 shows a third embodiment as another preferred embodiment of the present invention. This third embodiment differs from the first embodiment only in that the outer circumferential shape of the oil ring is different. In all other respects, the structure is the same as the first embodiment.

In the third embodiment, the outer circumferential surface 11 of the upper rail 7 of the oil ring 5 is comprised of an arc-shaped curved surface 11b smoothly joining to the upper surface 12 of the upper rail 7 with the radial rail width decreasing from the lower end of the upper rail 7. The radial width B of the arc-shaped curved surface 11b is from 25 to 75 micrometers.

The outer circumferential surface 15 of the lower rail 8 is comprised of an arc-shaped curved surface 15c smoothly joining to the lower surface 17 of the lower rail 8 with the radial rail width decreasing from the upper end of the lower rail 8. The radial width of the arc-shaped curved surface 15c is from 25 to 75 micrometers.

In the case of this third embodiment also, even if a tilt in the piston 1 occurs, an increase in localized friction due to the rail outer circumferential corner is suppressed and low friction is achieved. The sharp corner on the lower end of the upper rail 7 contributes to improving the oil scraping performance.

Figure 4A:
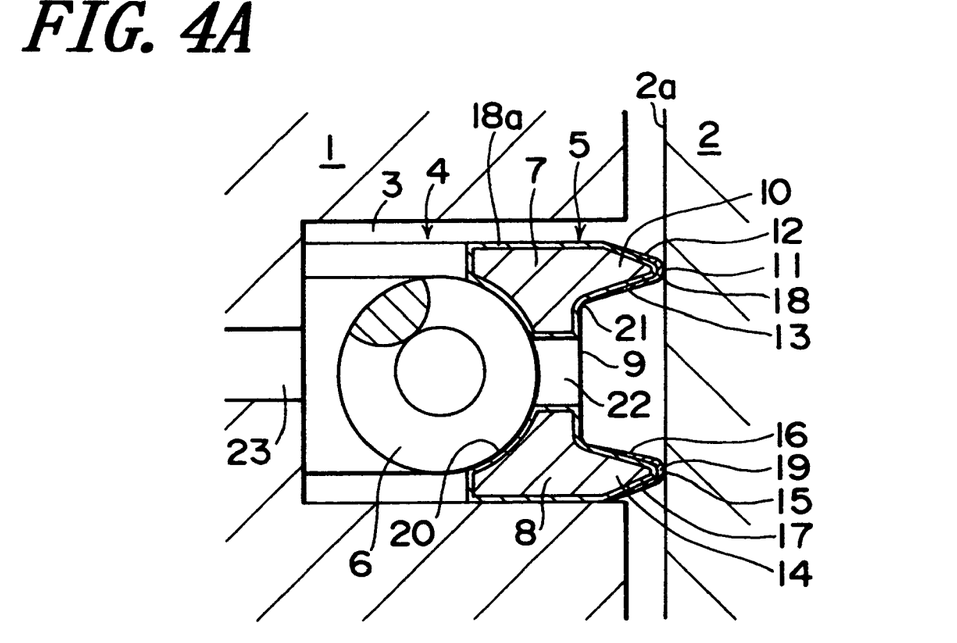
FIG. 4A is a vertical cross sectional view showing the combined oil ring mounted on the piston within the cylinder.
Figure 4B:
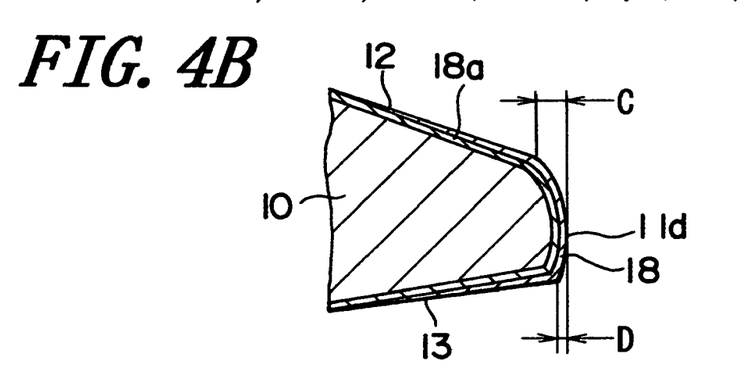
FIG. 4B is an enlarged cross sectional view showing a portion of the upper rail.
Figure 4C:
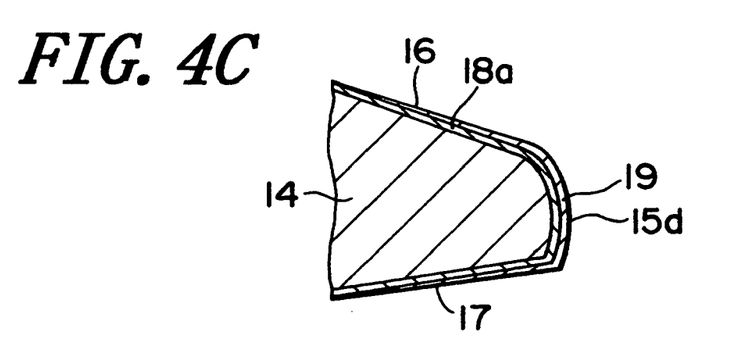
FIG. 4C is an enlarged cross sectional view showing a portion of the lower rail.

FIG. 4 shows a fourth embodiment as another preferred embodiment of the present invention. This fourth embodiment differs from the first embodiment only in that the shape of the outer circumference of the oil ring is different. In all other respects, the structure is the same as the first embodiment.

In the fourth embodiment, the outer circumferential surface 11 of the upper rail 7 of the oil ring 5 is comprised of an asymmetrical barrel curved surface lid whose highest point is located at the lower side axially from the center of the axial width of the upper rail 7, and joins smoothly to the upper surface 12 of the upper rail 7. The radial width C on the upper side of the asymmetrical barrel curved surface 11d is from 25 to 75 micrometers, and the radial width D on the lower side is from 1 to 20 micrometers.

The outer circumferential surface 15 of the lower rail 8 is formed the same as the outer circumferential surface 11 of the upper rail 7. The outer circumferential surface 15 is comprised of an asymmetrical barrel curved surface 15d whose highest point is located at the lower side axially from the center of the axial width of the lower rail 8, and joins smoothly to the lower surface 17 of the lower rail 8.

In the case of this fourth embodiment also, even if a tilt in the piston 1 occurs, an increase in localized friction due to the rail outer circumferential corner is suppressed and low friction is achieved. Moreover, oil scraping performance is improved and the scuff resistance is improved.

The combined oil ring of the present invention and the combined oil ring of the prior art were respectively mounted in engines with a single cylinder and motoring test was performed.

Figure 5:
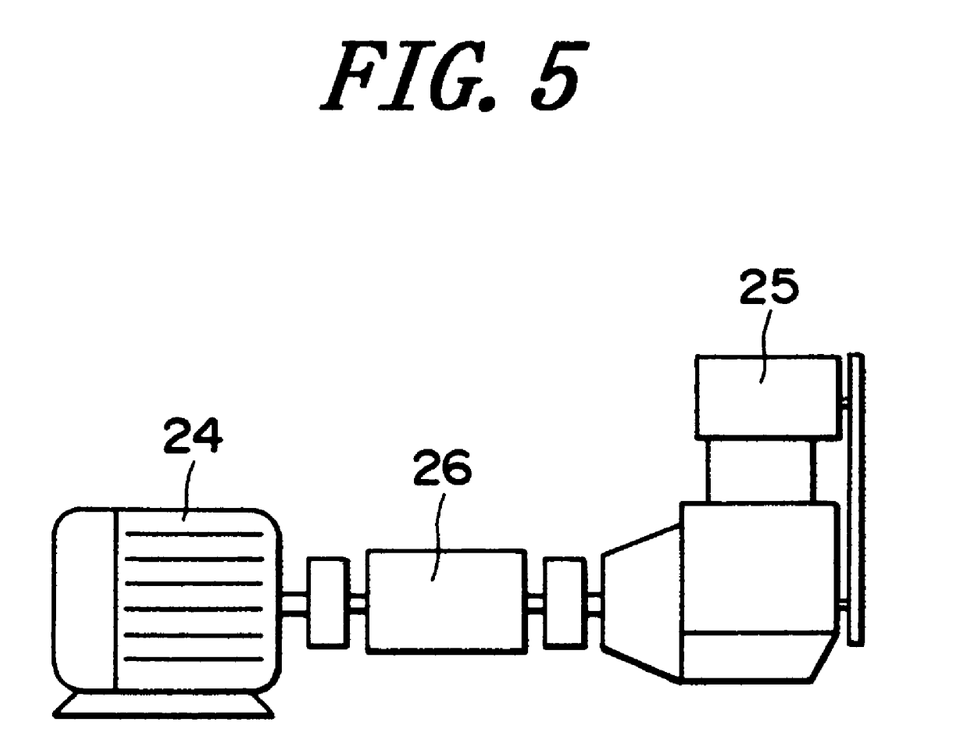
FIG. 5 is a drawing showing the motoring tester unit.

As shown in FIG. 5, in this motoring test, an engine 25 was driven by a motor 24. The loss in the engine 25 due to friction was measured by a torque detector 26 to measure the friction loss for one cycle. The test conditions were as follows.

1. Head opening
2. Separate water and oil pump drive
3. Oil 5W30
4. Oil and water temperature 80° C.

Results from measuring friction loss in the motoring test are shown in Table 1. In Table 1, the friction ratio for the prior art is set as 1. As shown in Table 1, the combined oil ring of the present invention has a low friction compared to the combined oil ring of the prior art and low friction is achieved. Further, this table also shows that the physical vapor deposition (PVD) film or the diamond-like carbon (DLC) film has a lower friction compared to when the outermost surface of the outer circumferential surface is a nitrided layer.

TABLE 1

| | OIL RING | | |
|---|---|---|---|
| | Outer Circumferential Surface Shape | Surface Treatment | Friction Ratio |
| 1 | First embodiment | Nitriding + PVD (CrN) | 0.94 |
| 2 | First embodiment | Nitriding + DLC | 0.94 |
| 3 | First embodiment | Nitriding | 0.95 |
| 4 | Second embodiment | Nitriding | 0.97 |
| 5 | Third embodiment | Nitriding | 0.97 |
| 6 | Fourth embodiment | Nitriding | 0.96 |
| 7 | Prior art (FIGS. 6A and 6B) | Nitriding | 1.00 |

The invention claimed is:

1. A combined oil ring comprising an oil ring with upper and lower rails and an expander for applying contact pressure radially outwards on said oil ring, wherein said upper and lower rails of said oil ring have outer circumferential surfaces, wherein said outer circumferential surface of said upper rail comprises an asymmetrical barrel curved surface whose highest point is located at the lower side axially from the center of the axial rail width; and wherein said outer circumferential surface of said lower rail comprises an asymmetrical barrel curved surface whose highest point is located at the lower side axially from the center of the axial rail width.

2. A combined oil ring as claimed in claim 1, wherein a radial width on the upper side of said curved surface is from 25 to 75 micrometers, and a radial width on the lower side is from 1 to 20 micrometers.

3. A combined oil ring as claimed in claim 2, wherein the outer circumferential surfaces of said upper and lower rails are subjected to a low-friction surface treatment.

4. A combined oil ring as claimed in claim 1, wherein the outer circumferential surfaces of said upper and lower rails are subjected to a low-friction surface treatment.

* * * * *